(12) United States Patent
Kang (10) Patent No.: US 7,583,894 B2
(45) Date of Patent: Sep. 1, 2009

(54) INTERFEROMETRIC OPERATION OF ELECTROABSORPTION MODULATORS

(75) Inventor: Inuk Kang, Freehold, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 526 days.

(21) Appl. No.: 11/534,029

(22) Filed: Sep. 21, 2006

(65) Prior Publication Data

US 2008/0074722 A1 Mar. 27, 2008

(51) Int. Cl.
*H04K 3/00* (2006.01)
*G02F 1/035* (2006.01)
*G02F 1/295* (2006.01)
*G02B 1/10* (2006.01)

(52) U.S. Cl. .......... 398/39; 398/183; 398/184; 398/186; 398/200; 398/201; 385/2; 385/8; 385/27; 385/31; 385/32; 385/42; 385/45; 375/298; 375/300; 375/308; 359/583; 359/254

(58) Field of Classification Search .......... 385/2, 385/8, 27, 31, 32, 42, 45; 398/39, 183, 184, 398/186, 200, 201; 375/298, 300, 308; 359/583, 359/245, 254, 301
See application file for complete search history.

(56) References Cited

U.S. PATENT DOCUMENTS 7,321,734 B2 * 1/2008 Roberts et al. .......... 398/193

FOREIGN PATENT DOCUMENTS

EP 1315025 5/2003

OTHER PUBLICATIONS

Shin M et al: "A novel BPSK method using multiple quantum well electroabsorption modulator integrated with MMI couplers" Microwave Photonics, 1999, MWP '99, Melbourne, VIC, AU.
Vagos et al: "All-Optical Phase Modulation Based in Intersub-Band Birefringence in GAAS/ALGAAS Quantum Well Waveguides", Electronics Letters, vol. 31, No. 3 Feb 2, 1995.
Wen Piao Lin et al: "Optically based direct sequence binary phase shift keying modulation scheme for indoor ultrawide band wireless systems" Jap J App Phy V45, 4A, Apr. 2006.

(Continued)

*Primary Examiner*—Evelyn A. Lester (57) ABSTRACT

Methods and apparatus are described for modulating an optical signal using electroabsorption in conjunction with an optical interferometer. Phase-shift keying modulation can be achieved with lower amplitude modulator drive signals than conventional methods by splitting the signal to be modulated into multiple optical modes and interferometrically combining the modes after modulating at least one of the modes with an EAM. Using the present invention, the extinction ratio performance of ASK can be significantly improved for a given drive voltage or a desired extinction ratio can be achieved with a substantially lower drive voltage. Hence, the elecro-optic bandwidth of EAMs can be enhanced by overcoming the trade-off relationship between extinction ratio and bandwidth. Furthermore, the present invention can be used to generate other modulation formats, such as QPSK or QAM, with much lower drive voltages, thereby reducing the cost and power consumption of the high-speed drive electronics for the modulation.

20 Claims, 9 Drawing Sheets

OTHER PUBLICATIONS

Inuk Kang: "Phase shift keying and on off keying with improved performances using electroabsorption modulators with interferometric effects", Op Exp, vol. 15, No. 4 Feb. 19, 2007.

H. Fukano et al., 40 Gbit/s Electroabsorption Modulators With 1.1 V Driving Voltage, Elec. Ltrs., Sep. 2, 2004, vol. 40, No. 18.

H. Kawanishi et al., EAM-Integrated DFB Laser Modules With More Than 40-GHz Bandwidth, IEEE Phot. Tech. Ltrs., Sep. 2001, vol. 13, No. 9, pp. 954-956.

B. Mason et al., 40-Gb/s Tandem Electroabsorption Modulator, IEEE Phot. Tech. Ltrs., Jan. 2002, vol. 14, No. 1, pp. 27-29.

* cited by examiner

FIG. 9

INTERFEROMETRIC OPERATION OF ELECTROABSORPTION MODULATORS

FIELD OF THE INVENTION

The present invention relates to the field of high-speed optical communications, and more specifically to electroabsorption modulation methods and apparatus.

BACKGROUND INFORMATION

Semiconductor electroabsorption modulators (EAMs) offer the advantages of low drive voltage, small form factor, and integratability with active optical elements. EAM-integrated lasers are widely used in metro-distance communication networks. EAMs are also key building blocks for highly integrated photonic circuits. The low drive voltage requirement of EAMs is especially promising for emerging high bit-rate (>100 Gb/s) communications, where the wide-band electrical amplification required for driving lithium niobate modulators (LNMs) is difficult to achieve.

In contrast to LNMs, which typically are operated using phase modulation combined with interferometric structures, EAMs have been used as single amplitude modulation elements. Considering the importance of phase shift keying (PSK) modulation, including quadrature phase shift keying (QPSK), and quadrature amplitude modulation (QAM) in high bit-rate, high spectral-efficiency transmission, it would be desirable to use EAMs for a wider range of modulation formats other than amplitude modulation.

SUMMARY OF THE INVENTION

The present invention is directed to modulating optical signals using electroabsorption in conjunction with an optical interferometer. In an exemplary embodiment, phase shift keying (PSK) modulation is performed using a polarization-sensitive electroabsorption modulator (EAM) operating interferometrically. The PSK modulation is achieved by interferometrically combining the transverse electric (TE) and transverse magnetic (TM) modes of an optical signal propagating through the EAM.

In a further exemplary embodiment, interferometric operation of an EAM is used to perform amplitude shift keying (ASK) modulation, such as on-off keying (OOK). For ASK modulation, interferometric operation of an EAM provides significantly improved extinction ratio performance for the same drive voltage, or alternatively it allows EAMs to be operated at much lower drive voltages for a desired extinction ratio. The present invention can be used to enhance the electro-optic bandwidth of EAMs, overcoming the trade-off relationship between extinction ratio and bandwidth.

In further exemplary embodiments, EAMs incorporated into an interferometer structure, such as a Mach-Zehnder interferometer (MZI). In one such embodiment, an EAM is included in each arm of an MZI with the outputs of the EAMs being interferometrically combined. Such EAM-MZI structures can be combined to provide various modulation formats, in accordance with the present invention.

In addition to the aforementioned, the present invention can be used for a wide variety of modulation formats, including, for example, QPSK and QAM.

The aforementioned and other features and aspects of the present invention are described in greater detail below.

DETAILED DESCRIPTION

Figure 1:
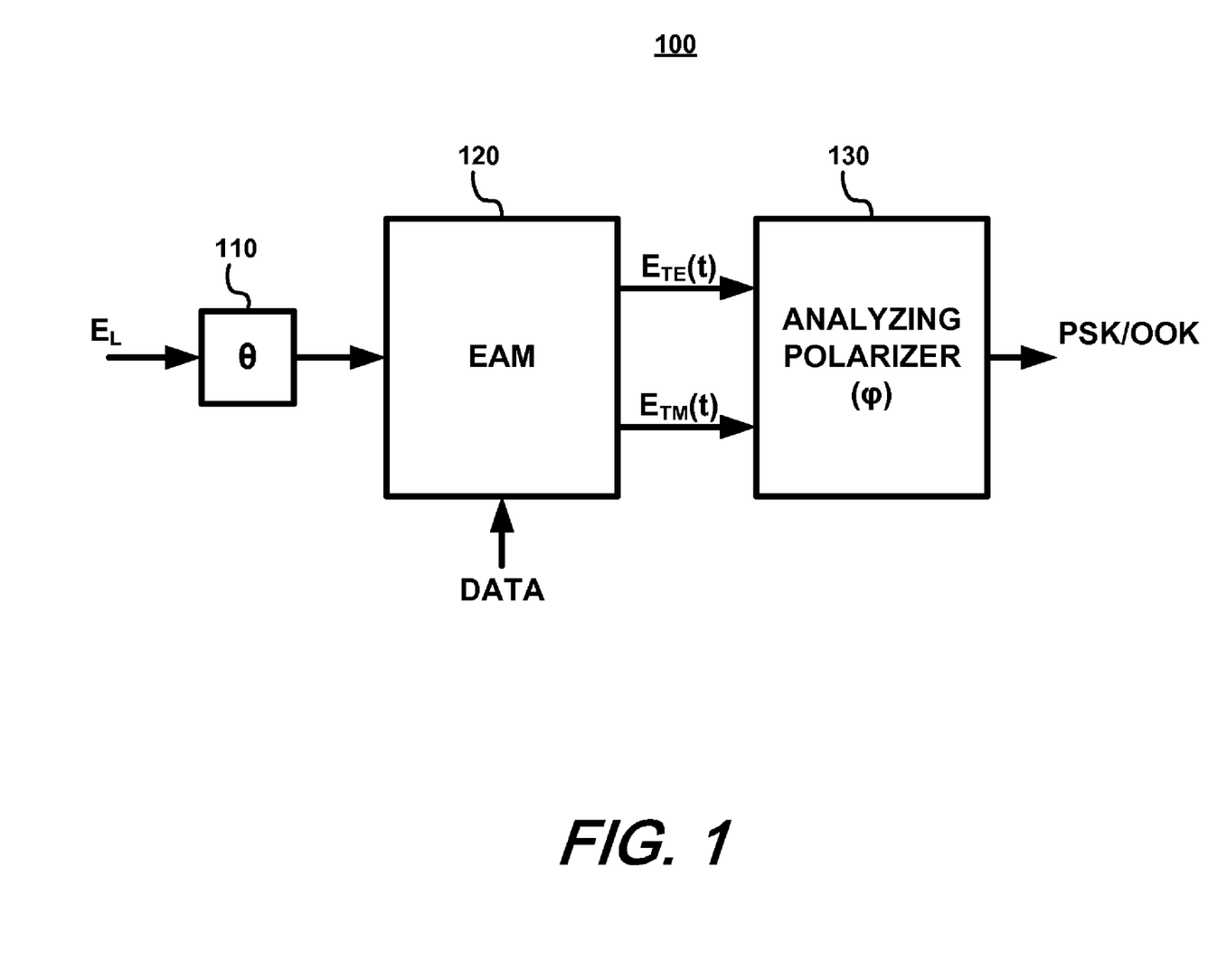
FIG. 1 is a block diagram of an exemplary embodiment of an interferometric modulation device comprising an electroabsorption modulator (EAM) in accordance with the present invention.

FIG. 1 is a block diagram of an exemplary embodiment of a system 100 comprising an electroabsorption modulator (EAM) operating interferometrically in accordance with the present invention. In the system 100, a laser light having an electric field designated $E_L$ is launched via a polarization controller 110 into an EAM 120. The launched laser light may be any suitable laser light and may be modulated or unmodulated, including, for example, a continuous wave (CW) laser or an optical pulse train. The polarization controller 110 controls the launch angle θ of the laser. The launch angle θ is the angle of the electric field $E_L$ of the laser with respect to the transverse electric (TE) axis of the EAM 120. An analyzing polarizer 130 is arranged at the output of the EAM 120 with an orientation angle of φ with respect to the TE axis of the EAM 120.

Figure 2A:
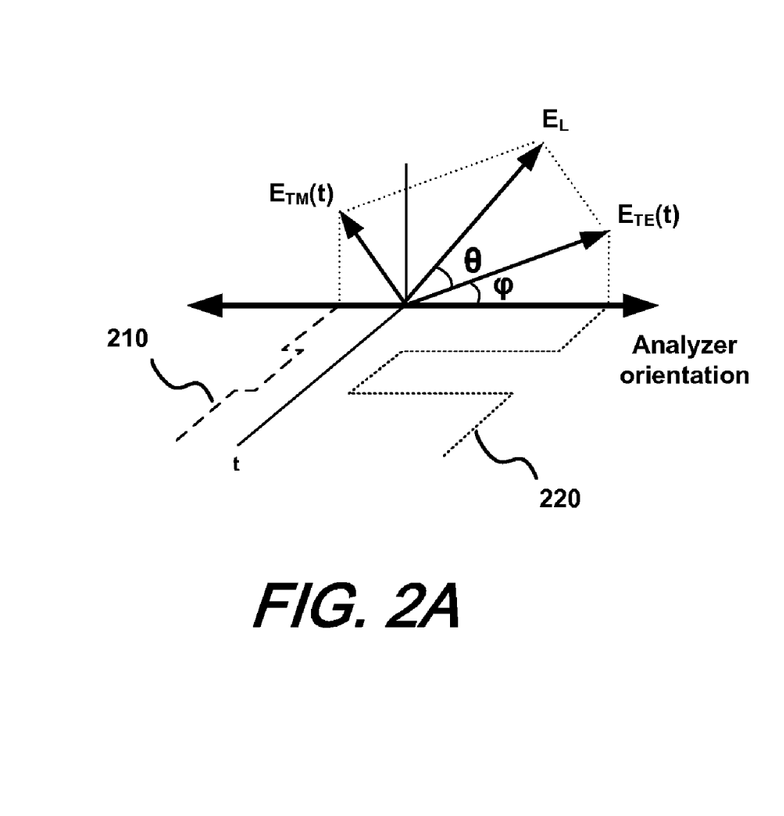
FIGS. 2A-2C graphically illustrate interferometric operation of an EAM in accordance with the present invention.

FIG. 2A graphically illustrates the principle of operation of the above-described arrangement. The electric field $E_L$ is shown as a vector which is decomposed along the TE and transverse magnetic (TM) axes of the EAM 120. The TE and TM components of the electric field $E_L$ are shown in FIG. 2A as the vectors $E_{TE}(t)$ and $E_{TM}(t)$, respectively. The TE and TM components $E_{TE}(t)$ and $E_{TM}(t)$ are projected onto the analyzing polarizer 130, which interterferometrically combines the respective projections.

The EAM 120 amplitude modulates the laser in accordance with a data stream (DATA). As the laser is modulated with data and its electric field $E_L$ varies with time, the TE and TM component fields $E_{TE}(t)$ and $E_{TM}(t)$ and their projections onto the analyzing polarizer 130 will vary accordingly, as shown along the t-axis in FIG. 2A by the traces 210 and 220.

As can be readily appreciated from FIG. 2A, the relative magnitudes and modulation depths of the two projected fields 210, 220 can be adjusted by controlling the launch and analyzer orientation angles, θ and φ, respectively.

EAMs based on quantum wells show preferential TE-polarization absorption unless the anisotropy is relieved by tensile strains. As shown in FIG. 2A, the TE modulation depth is substantially larger than the TM modulation depth. For example, a commercial EAM device such as the OKI OM5753C-30B has a TE modulation depth approximately 9 dB larger than the TM modulation depth for a 2V drive signal amplitude and a −1V bias voltage.

Figure 2B:
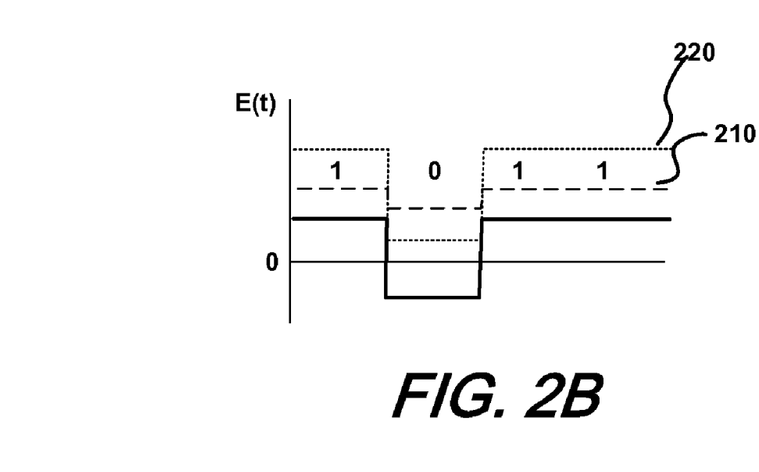
Figure 2C:
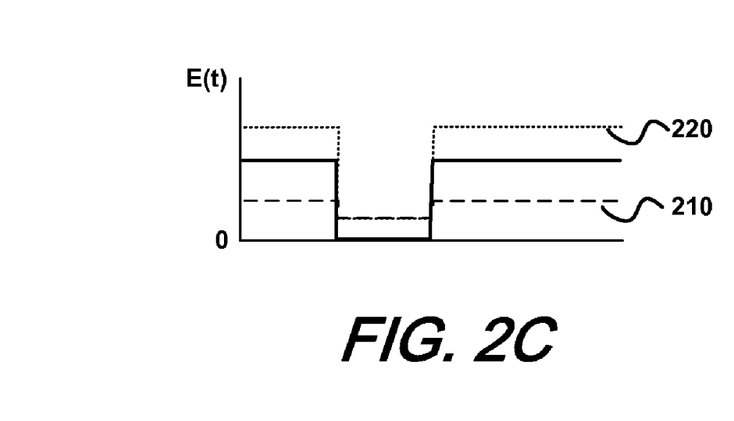

As shown in FIGS. 2B and 2C, respectively, PSK modulation or amplitude shift keying (ASK) modulation, such as on-off keying (OOK), can be achieved by properly adjusting the angle parameters, $\theta$ and $\phi$, which affect the TE and TM projections. Thus, while the "raw" modulation depths of the TE and TM modes are set by the properties of the EAM and the bias and drive voltages, the present invention makes it possible, by interferometric operation, to achieve PSK or improve the amplitude modulation depths, i.e. extinction ratio, by adjusting the angle parameters $\theta$ and $\phi$.

As shown in FIG. 2B, PSK modulation can be achieved when the mean values of the TM and TE projection fields 210 and 220 are roughly equalized.

As shown in FIG. 2C, OOK modulation with an enhanced extinction ratio can be achieved when the low levels of the TE and TM projection fields 210 and 220 are equalized.

Figure 3:
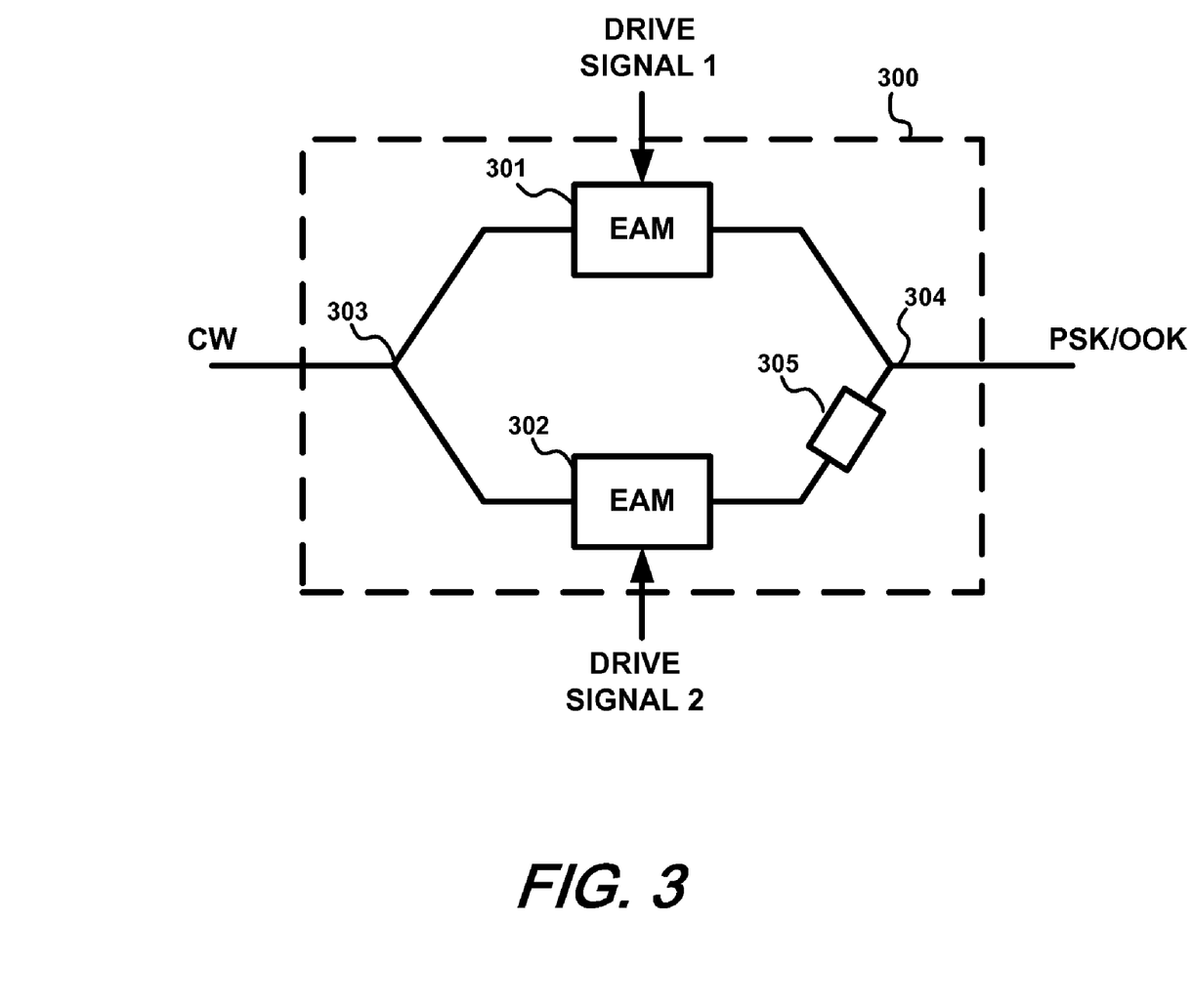
FIG. 3 shows an exemplary embodiment of an EAM-Mach-Zehnder interferometer (EAM-MZI) structure in accordance with the present invention.

In further exemplary embodiments, the operational principle of the present invention can be realized utilizing other arrangements, including, for example, a Mach-Zehnder interferometer (MZI) with an EAM in each arm, as shown in FIG. 3. In addition to reduced polarization sensitivity, such an embodiment may be beneficial in reducing excess loss, as discussed below.

As shown in FIG. 3, a MZI 300 comprises a first EAM 301 in a first arm and a second EAM 302 in a second arm, with a phase shifter 305 arranged in the second arm, in line with the EAM 302. (As can be appreciated, a phase shifter can be arranged in the first arm instead of the second arm, or in both arms, so long as the appropriate phase relationship between the two arms is provided.) The EAMs 301 and 302 are driven by respective drive signals, Drive Signal 1 and Drive Signal 2. A CW laser is provided to the EAMs 301, 302 via an input coupler (or splitter) 303. The outputs of the EAMs 301, 302 (via the phase shifter 305) are combined by an output coupler 304.

Various drive signal configurations may be employed depending on the type of modulation format, the specification of the EAMs, and the coupling ratio of the input and output couplers 303, 304.

Figure 4A:
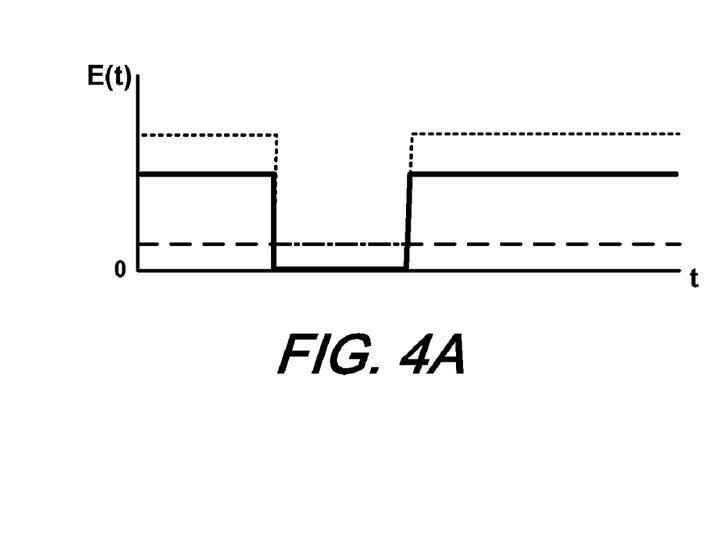
FIGS. 4A and 4B illustrate OOK and PSK signals generated with the EAM-MZI structure of FIG. 3.

In a first such configuration, one of the EAM drive signals (e.g., Drive Signal 1) is the data signal to be modulated. The other EAM drive signal (e.g., Drive Signal 2) is a DC bias voltage which is selected so that the CW transmission through the corresponding EAM (302) cancels the low level of the modulated signal in the other EAM (301), as shown in FIG. 4A. In FIG. 4A, the dotted trace represents an NRZ-OOK modulated signal in the first EAM 301, the dashed trace represents the CW transmission signal attenuated by the second EAM 302 and the solid trace represents the output signal resulting from the destructive interference of the aforementioned signals. Such a configuration provides an improvement in extinction ratio over OOK generated by an individual EAM operating conventionally.

The DC bias voltage to be applied (as Drive Signal 2) will depend on the dynamic extinction ratio of the first EAM 301 and the coupling ratios of the couplers 303, 304. The coupling ratios are preferably selected to reduce the transmission loss of the EAM-MZI structure. Factors which affect the optimal coupling ratio include the raw extinction ratio of the first EAM 301, the intended modulation format, and the insertion losses of the two EAMs. If the goal is to increase the extinction ratio of OOK, then the power splitting ratio of the input coupler 303 should be $\epsilon/(1+\epsilon)$, where $\epsilon$ is the raw extinction ratio if the second EAM 302 has the same insertion loss as the first EAM 301 and no voltage is applied to the second EAM 302. Other coupling ratios may be used if the second EAM 302 is to be biased to control the propagation loss. Because it may be difficult to know all of the device parameters in advance, a variable coupler may be advantageous. The coupling ratio can be fixed, however, and the extinction ratio optimized by adjusting the bias voltage to the second EAM 302.

This single data drive signal configuration can also be used to generate PSK signals by adjusting the DC bias voltage (Drive Signal 2) accordingly.

Figure 4B:
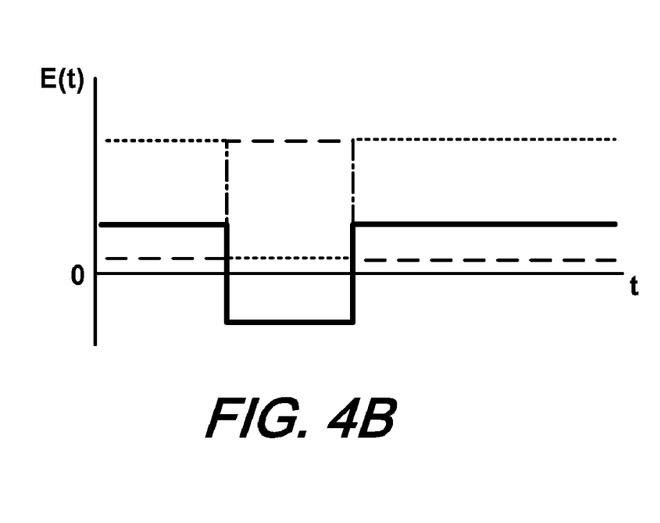

In a second drive signal configuration, Drive Signal 1 is the data signal D and Drive Signal 2 is the complementary data signal $\overline{D}$. This configuration can be used, for example, to generate Binary PSK signals (BPSK) with reduced optical loss. The signals in this driving configuration are shown in FIG. 4B in which the dotted trace represents the OOK signal output of the first EAM (driven by the data signal D), the dashed trace represents the OOK signal output of the second EAM (driven by the complementary data signal $\overline{D}$) and the solid trace represents the PSK signal resulting from the destructive interference of the two EAM output signals. This dual drive scheme reduces the optical loss by at least 6 dB in comparison to PSK generation with a single data drive signal.

A comparison of FIGS. 2A and 2B with FIGS. 4A and 4B shows the benefit of the EAM-MZI structure in reducing the optical loss resulting from the destructive interference. For generating PSK, the arrangement represented by FIG. 4B is superior to that of FIG. 2B because at least 6 dB less optical power is subtracted during the destructive interference. Similarly, FIG. 4A is superior to FIG. 2C in generating extinction-enhanced OOK signals as less optical power is lost during the destructive interference.

Figure 5:
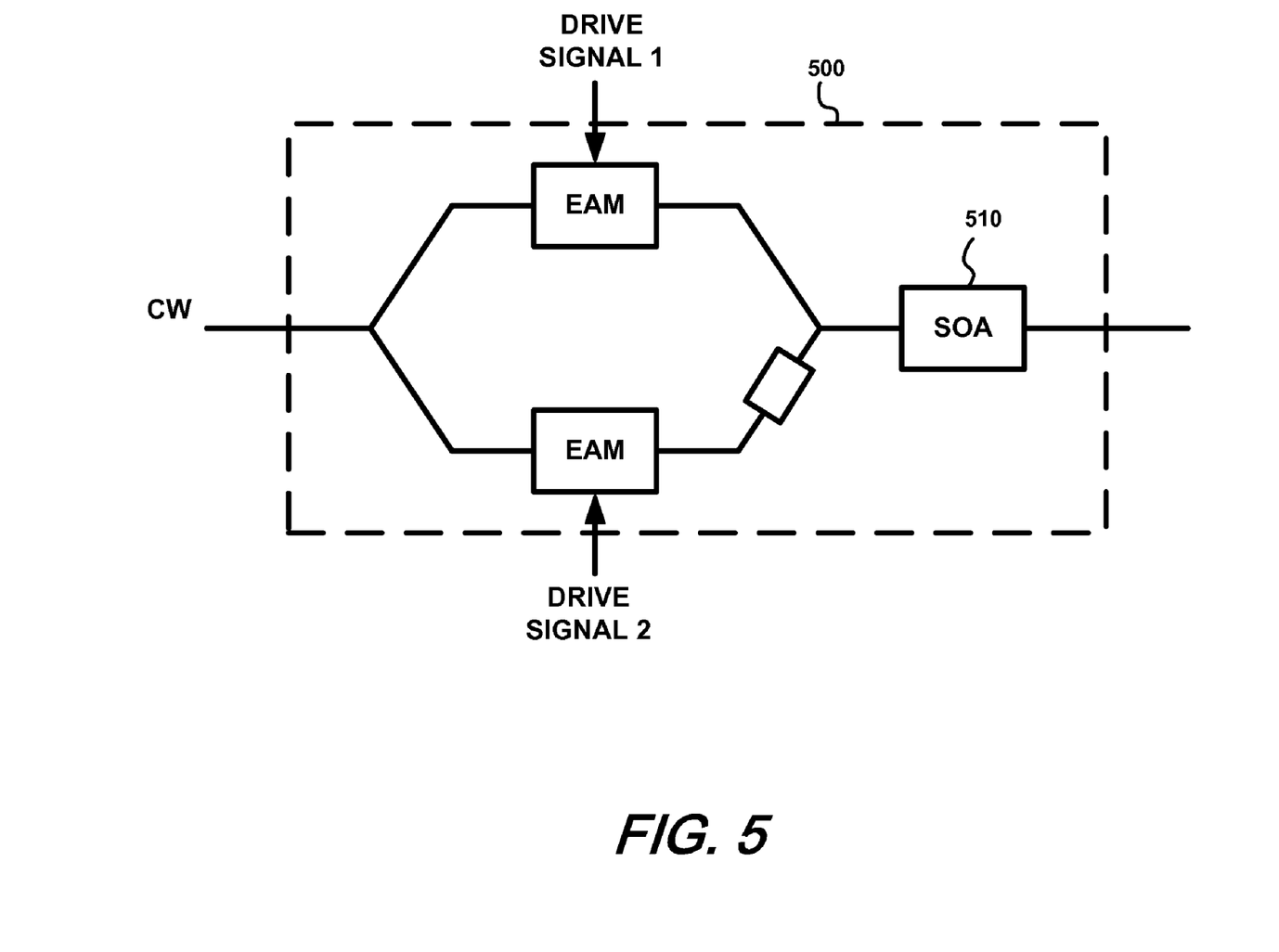
FIG. 5 shows an exemplary embodiment of an EAM-MZI structure incorporating a semiconductor optical amplifier (SOA), in accordance with the present invention.

The destructive interference employed in generating signals in accordance with the principles of the present invention results in optical loss. This optical loss, however, can be compensated for by providing amplification, as in the exemplary device shown in FIG. 5. In the device of FIG. 5, a semiconductor optical amplifier (SOA) 510 is preferably integrated into an EAM-MZI device 500 to compensate for the aforementioned optical loss. In order to minimize the impact of any pattern dependence of the SOA, it is preferable to place the SOA at the output of the modulator (as shown) for PSK generation, or at the input of the modulator for OOK generation. The ability to readily integrate SOAs with the EAM-based modulators of the present invention is an advantage over other devices, such as lithium niobate modulators, for example.

Although the foregoing description was made with reference to non-return-to-zero (NRZ) signal formats, the same optical modulators can also be used with RZ formats as well. An exemplary arrangement of obtaining the drive signal for RZ format generation consists of an electronic AND circuit, performing the Boolean operation between the NRZ data signal and a clock signal of the line rate. The product of the AND operation can be used to drive the EAM-MZI modulators to generate RZ-format signals. EAM-based modulators such as those of the present invention are better suited for employing such a technique than are lithium niobate modulators because of the low drive voltage as well as the optical transmission characteristic, which is highly nonlinear as a function of the drive voltage. At high bit rates, the Boolean AND operation tends to introduce signal distortion, especially for large amplitude signals. Lithium niobate modulators are more susceptible to such distortion due to their fairly linear transmission response with respect to the drive voltages.

Figure 6:
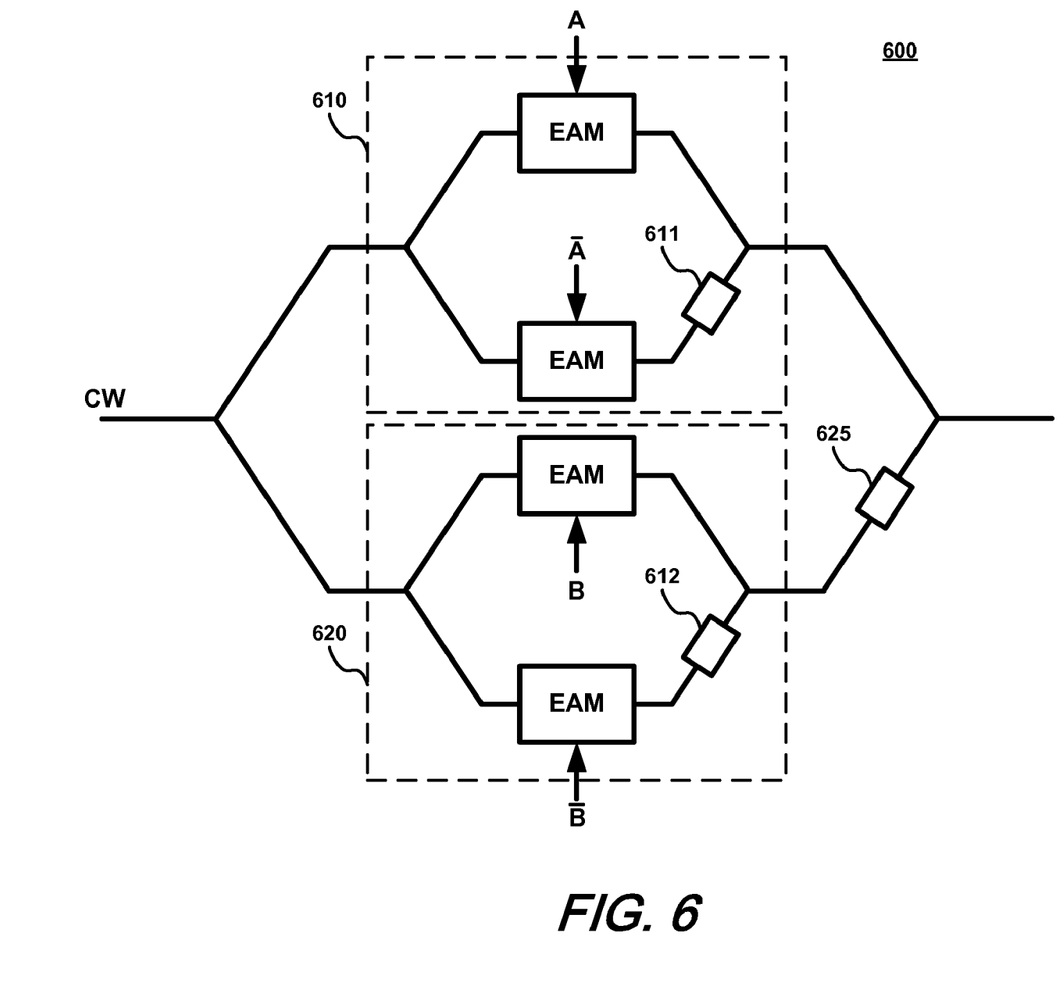
FIG. 6 shows an exemplary embodiment of a modulator incorporating multiple EAM-MZI structures, in accordance with the present invention.

The generation of more complicated modulation formats can be achieved by combining multiple EAM-interferometer structures in accordance with the present invention. An exemplary embodiment of a modulator that can be used to generate QPSK signals is shown in FIG. 6. The modulator shown in FIG. 6 comprises a first EAM-MZI structure 610 and a second EAM-MZI structure 620 arranged in an MZI structure 600. The EAM-MZI structures 610 and 620 each comprises a $\pi$ phase shifter 611, 612, respectively, and each is driven by a data signal and its complement (A, $\overline{A}$ and B, $\overline{B}$, respectively) to generate corresponding BPSK modulated signals. The BPSK signals are combined to produce a QPSK signal by introducing a relative phase shift of $\pi/2$ between the two signals. Such a phase shift is provided by the phase shifter 625.

QPSK generation using EAM interferometers, such as by the exemplary embodiment of FIG. 6, enjoys substantially reduced drive voltage requirements, thereby reducing the cost and power consumption of the drive electronics.

The device of FIG. 6 can be used for generating other signal formats, including, for example, 8-QAM signals. To do so, one of the EAM-MZIs 610, 620 (but not both) is effectively disabled for a bit period, such as by applying the same voltage to both drive signal inputs of the EAM-MZI to be disabled.

The performance of exemplary embodiments of EAM-based interferometric devices in accordance with the present invention will now be described.

In an exemplary embodiment of a device such as that of FIG. 1, CW light with a wavelength of 1553 nm is used and its launch angle into the EAM (120) is controlled using an HP8169A polarization controller (110). The polarization of the output of the EAM is controlled using a paddle polarization controller and the output of the EAM is analyzed by a fiber-optic polarizer. The EAM has a 3-dB bandwidth of 30 GHz and the amplitude of the drive signal is 2.6 volts.

Figure 7A:
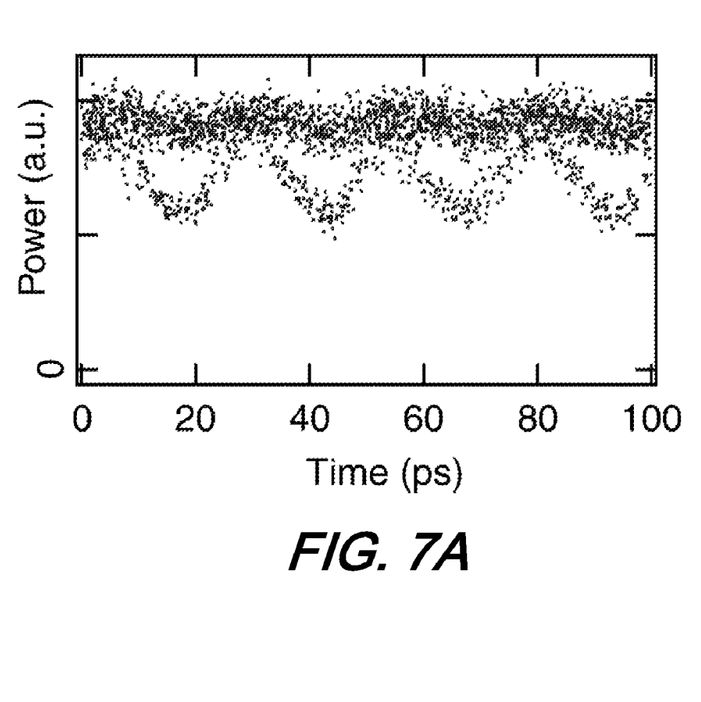
FIGS. 7A and 7B show eye diagrams of a PSK signal generated by an exemplary embodiment of a modulation device in accordance with the present invention, before and after demodulation, respectively.
Figure 7B:
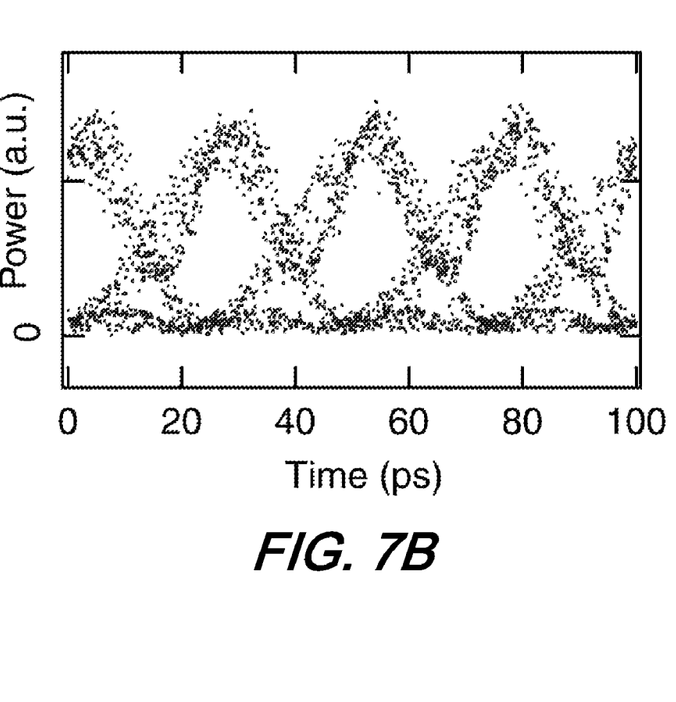

FIG. 7A shows the electrical eye diagram of a 40-Gb/s PSK signal generated by such a system. FIG. 7B shows the eye diagram of the PSK signal after demodulation by a 25-ps delay interferometer.

The demodulated signal was then electronically de-multiplexed and bit error rates (BER) were measured at 10 Gb/s after an erbium-doped fiber amplifier (EDFA) with a noise figure of 5.6 dB and an optical filter with 1-nm bandwidth. The receiver sensitivity at a BER of $10^{-9}$ is −24.3 dBm. This is approximately 3 dB worse than that obtained with PSK generated using a lithium niobate modulator biased at a null. As evidenced in the demodulated eye diagram (FIG. 7B), the penalty is mostly due to the waveform distortion caused by the incomplete interference between the TE and TM fields, which have non-identical temporal shapes owing to the different responses of the two modes to the drive signal.

With respect to the generation of ASK modulated signals, the extinction ratio of an ASK signal conventionally modulated by an EAM is related to the amplitude of the drive signal. Operation with a lower-voltage drive is preferable for reducing the power consumption and complexity of the driving electronics.

Figure 8A:
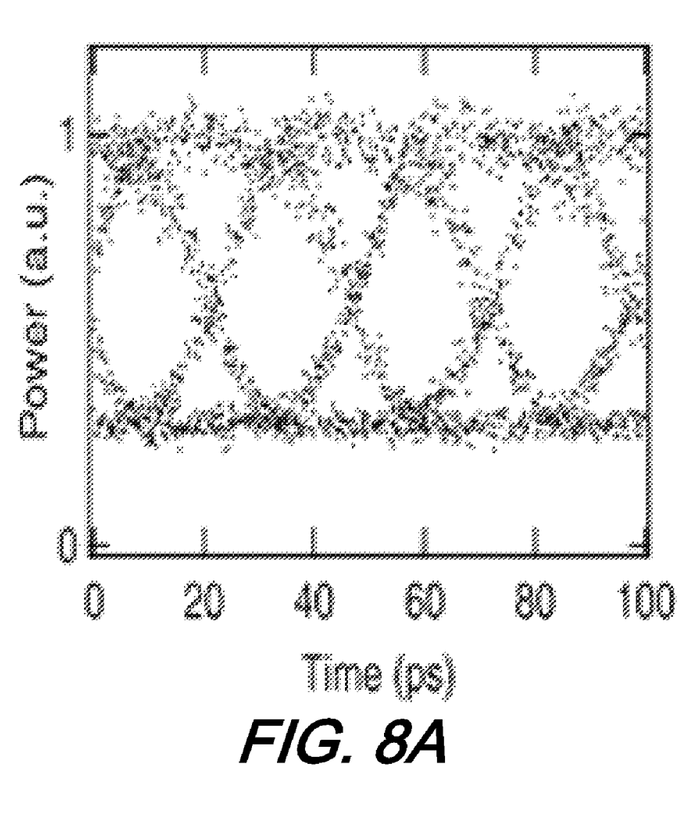
FIGS. 8A and 8B show eye diagrams of on-off keying (OOK) signals generated by an EAM without and with interferometric operation, respectively.
Figure 8B:
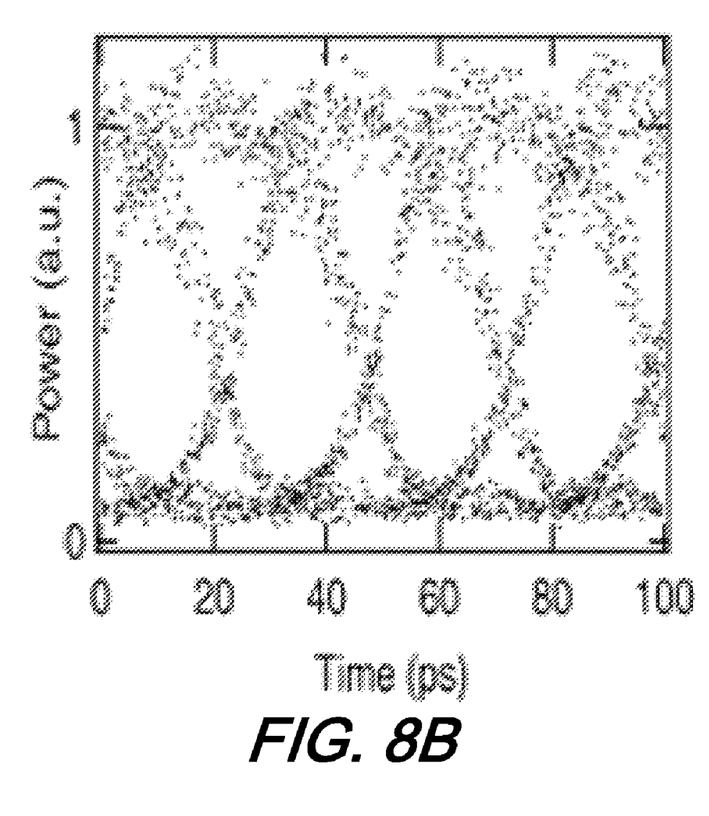

FIG. 8A shows the electrical eye diagram of OOK signals obtained directly from an EAM operating conventionally and not in an interferometric mode. In this case, the maximum extinction ratio (ER) is achieved when the CW laser is aligned with the TE axis of the EAM, which in this case is 5.7 dB for a 1.1 V drive voltage.

FIG. 7B shows a clear improvement in ER when operating the EAM in an interferometric mode with the angles θ and φ optimized. (For the exemplary data shown in FIG. 7B, the angles were 29 degrees.) The improved ER is measured to be 12.5 dB for the same drive voltage of 1.1 V.

Figure 9:
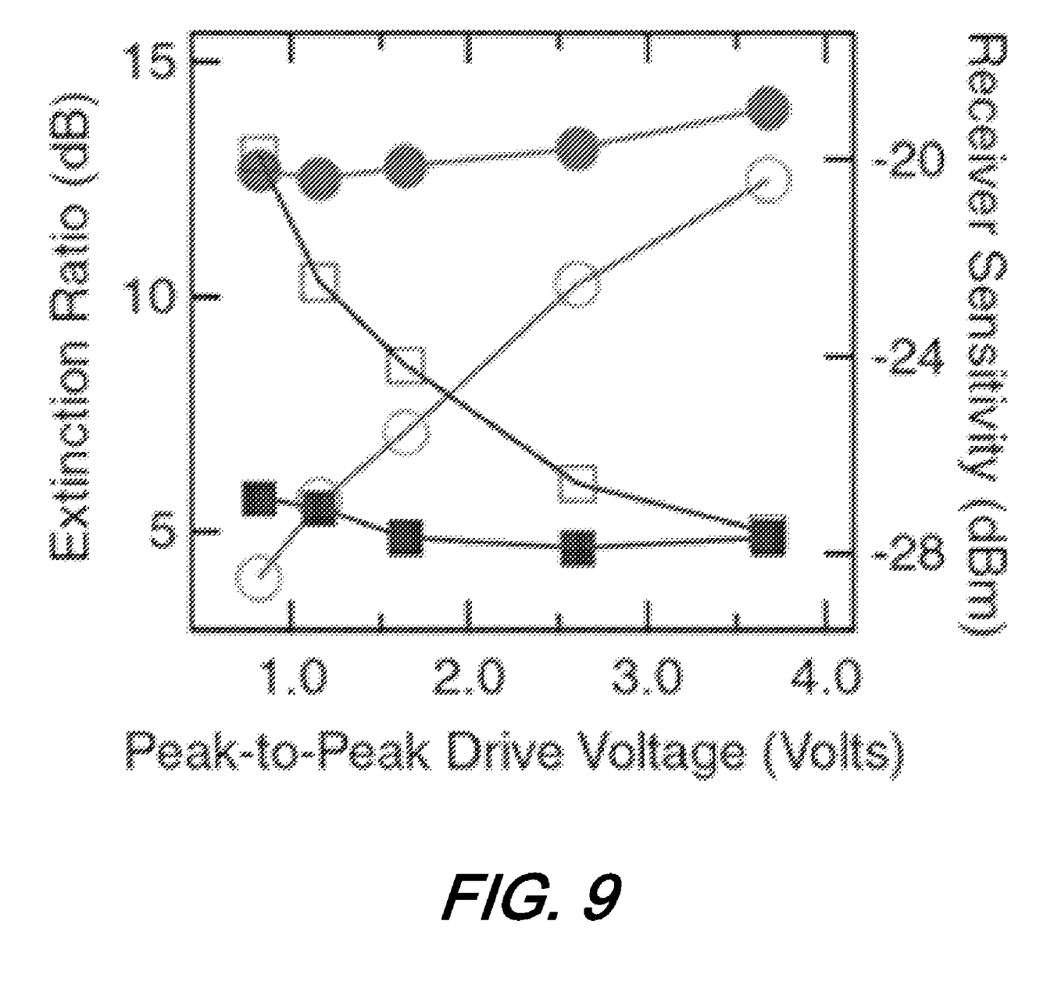
FIG. 9 shows graphs of the extinction ratio and receiver sensitivity for OOK signals generated by an EAM with and without interferometric operation.

FIG. 9 shows the extinction ratio (ER) and receiver sensitivity (RS) as function of drive voltage, for a BER of $10^{-9}$, for OOK signals generated by an EAM operating non-interferometrically and interferometrically. The open circles and squares represent the ER and RS, respectively, for the non-interferometric EAM and the solid circles and squares represent the ER and RS, respectively, for the interferometric EAM. For non-interferometric operation, the best ER and RS are achieved when the input laser light is aligned with the TE axis of the EAM. With interferometric operation in accordance with the present invention, FIG. 9 shows an ER improvement of 8.7 dB and an RS improvement of 7 dB for a drive voltage of 0.8V. Advantageously, 0.8V, 40-Gb/s drive signals can be generated in accordance with the present invention, without using an electrical amplifier.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of modulating an optical signal comprising the steps of:
    decomposing an optical signal to be modulated into at least two optical modes;
    modulating the electric field of at least one of the optical modes using at least one electroabsorption modulator (EAM); and
    interferometrically combining the optical modes to generate a modulated optical signal.

2. The method of claim 1, comprising the steps of:
    launching a laser light into the at least one EAM with an electric field of the laser light having a launch angle with respect to an axis of the EAM, whereby the laser is decomposed into transverse electric (TE) and transverse magnetic (TM) components;
    projecting the TE and TM components onto an analyzing polarizer having an orientation angle with respect to the axis of the EAM, thereby generating a TE component projection and a TM component projection; and
    interferometrically combining the TE component projection and the TM component projection to generate the modulated signal.

3. The method of claim 1, wherein the modulated optical signal is a phase shift keying (PSK) modulated signal.

4. The method of claim 1, wherein the modulated optical signal is an amplitude shift keying (ASK) modulated signal.

5. The method of claim 2 comprising the step of adjusting at least one of the launch angle and the orientation angle to control the modulated signal.

6. The method of claim 2, wherein the axis of the EAM is a TE axis of the EAM.

7. An apparatus for modulating an optical signal comprising:
    means for decomposing an optical signal to be modulated into at least two optical modes;
    electroabsorption modulator (EAM) means for modulating the electric field of at least one of the optical modes; and means for interferometrically combining the optical modes to generate a modulated optical signal.

8. The apparatus of claim 7 comprising:

polarization controller means for controlling a launch angle of an electric field of a laser light with respect to an axis of the EAM means, whereby the laser light is decomposed into transverse electric (TE) and transverse magnetic (TM) components; and analyzing polarizer means, the analyzing polarizer means having an orientation angle with respect to the axis of the EAM thereby generating a TE component projection and a TM component projection, the TE component projection and the TM component projection being interferometrically combined to generate the modulated optical signal.

9. The apparatus of claim 7, wherein the modulated optical signal is a phase shift keying (PSK) modulated signal.

10. The apparatus of claim 7, wherein the modulated optical signal is an amplitude shift keying (ASK) modulated signal.

11. The apparatus of claim 8 wherein at least one of the launch angle and the orientation angle is adjustable and controls the modulated signal.

12. The apparatus of claim 8, wherein the axis of the EAM means is a TE axis of the EAM means.

13. The apparatus of claim 7 comprising:

first interferometer means having first and second optical arms;

first EAM means, the first EAM means arranged in the first optical arm of the first interferometer means; and second EAM means, the second EAM means arranged in the second optical arm of the first interferometer means.

14. The apparatus of claim 13, wherein the first EAM means is driven by a data signal and the second EAM means is driven by a bias voltage.

15. The apparatus of claim 13, wherein the first EAM means is driven by a data signal and the second EAM means is driven by an inverse of the data signal.

16. The apparatus of claim 13, comprising semiconductor optical amplifier (SOA) means arranged in series with the first interferometer means.

17. The apparatus of claim 16, wherein the SOA means is arranged before the first interferometer means.

18. The apparatus of claim 16, wherein the SOA means is arranged after the first interferometer means.

19. The apparatus of claim 13, wherein the first interferometer means is a Mach-Zehnder interferometer.

20. The apparatus of claim 13, comprising:

second interferometer means having first and second optical arms;

third EAM means, the third EAM means arranged in the first optical arm of the second interferometer means;

fourth EAM means, the fourth EAM means arranged in the second optical arm of the second interferometer means; and third interferometer means having first and second optical arms, wherein the first interferometer means is arranged in the first optical arm of the third interferometer means and the second interferometer means is arranged in the second optical arm of the third interferometer means.

* * * * *